United States Patent Office 3,631,064
Patented Dec. 28, 1971

3,631,064
THIOPHENOCHROMENE COMPOUNDS AND PROCESS FOR PRODUCING THEM
Shiro Kimura, Sadao Ishige, and Teruo Kobayashi, Kanagawa, Japan, assignors to Fuji Photo Film Co., Ltd., Kanagawa, Japan
No Drawing. Filed Sept. 16, 1969, Ser. No. 858,526
Claims priority, application Japan, Sept. 16, 1968, 43/66,820
Int. Cl. C07d 63/22
U.S. Cl. 260—330.5     6 Claims

ABSTRACT OF THE DISCLOSURE

Novel thiophenochromene compounds, useful as color formers for use in pressure-sensitive copy papers, and a process for preparing these compounds are disclosed.

DESCRIPTION OF THE INVENTION

The present invention relates to novel thiophenochromene compounds and to a process for the production of them. That is, the present invention relates to novel thiophenochromene compounds having the general Formula III.

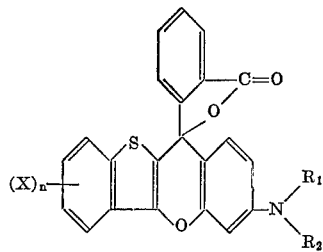

wherein each $R_1$ and $R_2$ is selected from the group consisting of an alkyl group having from 1 to 5 carbon atoms and a benzyl group; wherein X is selected from the group consisting of a hydrogen atom, a halogen atom, an alkoxyl group having from 1 to 5 carbon atoms, a methyl group and a t-butyl group; and wherein $n$ is an integer ranging from 1 to 3, and to a process for producing the compound represented by general Formula III by condensing a 2'(4' - N,N-substituted amino-2'-hydroxybenzoyl)-benzoic acid, such as a 2(4'-N,N-dialkylamino-2'-hydroxybenzoyl) benzoic acid or a 2-(4'-N-alkyl-N-benzyl amino-2'-hydroxybenzoyl) benzoic acid, having the general Formula I.

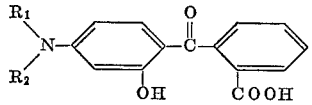

wherein each $R_1$ and $R_2$ is selected from the group consisting of an alkyl group having from 1 to 5 carbon atoms and a benzyl group, and a thioindoxyl derivative having the general Formula II.

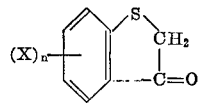

wherein each X is selected from the group consisting of a hydrogen atom, a halogen atom, an alkoxyl group having from 1 to 5 carbon atoms, and a methyl group, and wherein $n$ is an integer ranging from 1 to 3.

DETAILED DESCRIPTION OF THE INVENTION

The thiophenochromene compounds of the present invention are represented by the general formula:

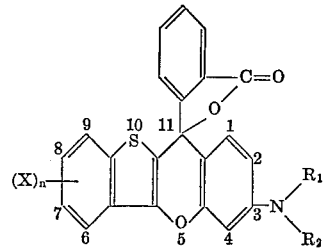

Typical examples of compounds represented by general Formula I are 2-(4'-N,N-diethylamino-2'-hydroxybenzoyl)benzoic acid, 2-(4'-N-benzyl-N-methylamino-2'-hydroxy) benzoyl benzoic acid, and the like. These compounds may be prepared by a known process wherein phthalic anhydride and a corresponding m-aminophenol are heated in toluene (see: Frdl., vol. 4, page 260).

The compound represented by general Formula II may be represented also by the following formula as the tautomer;

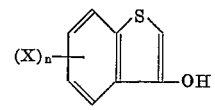

Typical examples of the compound represented by general Formula II are thioindoxyl, 5-chloro-7-methylthioindoxyl, 6 - ethoxythioindoxyl, 6 - chloro-4-methylthioindoxyl, 6-methoxythioindoxyl, 5-chloro-4,7-dimethylthioindoxyl, 5-bromothioindoxyl, 5,6,7-trichlorothioindoxyl, 4,6-dichlorothioindoxyl, 4,7-dichlorothioindoxyl, 4-chloro-7-methylthioindoxyl, 5-t-butylthioindoxyl, and 5-t-butyl-7-methylthioindoxyl. The aforesaid compounds are all known compounds.

The process of the present invention comprises condensing the aforesaid starting materials. That is, almost equimolar amounts of the starting materials mentioned above are reacted for from 1 to 24 hours at 30 to 100° C. in a condensation reaction medium, e.g., sulfuric acid having a concentration of higher than 60%. As the condensation reaction medium, a mixture of sulfuric acid and phosphoric anhydride, polyphosphoric acid, anhydrous zinc chloride, phosphorus oxychloride or fuming sulfuric acid can be employed instead of sulfuric acid. Sulfuric acid is preferred as the condensation reaction medium for the condensation system.

The reaction medium containing the reaction product of the condensation reaction is poured into a large amount of ice-cooled water, the product thus precipitated is recovered by filtration and treated by an aqueous alkaline solution to provide the compound of general Formula II as colorless crystals.

An infrared absorption spectral analysis and an elementary analysis was used to confirm that the compounds obtained above have the molecular structure represented by general Formula III. This is, the compounds prepared by the condensation reaction stated above have the characteristic absorption of the carbonyl group of the lactone ring at near 1750 cm.$^{-1}$ and do not have the characteristic absorptions corresponding to the carbonyl groups and the hydroxyl groups of the compounds represented by general Formulas I and II. Moreover, the results of the elementary analysis of these compounds coincide with the theoretical values.

The compounds prepared as above and represented by general Formula III are novel compounds. When these compounds are brought into contact with solid acids, organic acids or phenols, they change to a red-purple color and, thus, they are useful as color formers for pressure-sensitive copying papers, heat-sensitive copying papers, color-forming inks, and the like.

The following examples illustrate the preferred embodiments of the present invention.

Preparation of

Example I

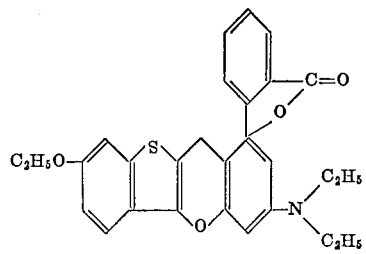

In 30 g. of 96% sulfuric acid were dissolved at a temperature of lower than 40° C. 15.7 g. (1/20 mole) of 2-(4'-N,N-diethylamino-2'-hydroxybenzoyl)benzoic acid and 9.7 g. (1/20 mole) of 6-ethoxy-thioindoxyl and the system was reacted for three hours at 90±2° C. The reaction product mixture was poured into 500 g. of ice-cooled water and the precipitate thus formed was filtered. The precipitate was extracted using 300 ml. of chloroform while neutralizing the system with an aqueous solution of sodium hydroxide. The chloroform solution thus recovered was washed several times with water and then concentrated under a reduced pressure. Recrystallization was accomplished with a mixed solvent of benzene and ligroin, and 18.6 g. of the lactone of 3-N,N-diethyl-amino-8-ethoxy-11-(orthocarboxyphenyl) - 11 - hydroxybenzo[4,5]-thiopheno[3,2-b] chromene was obtained as a colorless crystal having a melting point of 194–196° C.

Elementary analysis as $C_{28}H_{25}O_4NS$.—Calculated (percent): C, 71.31; H, 5.34; N, 2.97. Found (percent): C, 71.24; H, 5.36; N, 2.89.

The product prepared above was turned red-purple by a 95% acetic acid solution and the λ max. was at 570 mμ.

Example II

Preparation of

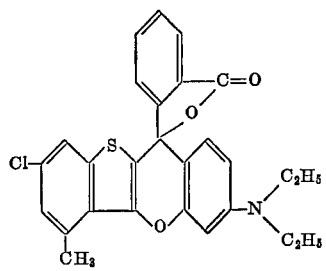

As in Example 1, 15.7 g. (1/20 mole) of 2-(4'-N,N-diethyl-amino-2'-hydroxybenzoyl) benzoic acid and 9.9 g. (1/20 mole) of 6-chloro-4-methylthioindoxyl were condensed and the product precipitated was recrystallized from acetone to provide 17.8 g. of a colorless crystal, of the lactone of 3-N,N-diethylamino-8-chloro-6-methyl-11-(orthocarboxyphenyl) - 11 - hydroxybenzo[4,5] - thiopheno[3,2-b]-chromene having a melting point of 234–235° C.

Elementary analysis: $C_{27}H_{22}O_3NSCl$.—Calculated (percent): C, 68.13; H, 4.66; N, 2.94. Found (percent): C, 68.21; H, 4.63; N, 2.91.

The λ max. of the lactone obtained in 95% acetic acid solution was at 573 mμ.

Example III

Preparation of

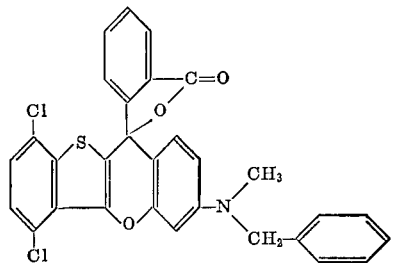

In 40 g. of 98% sulfuric acid were dissolved 18.1 g. (1/20 mole) of 2-(4'-N-benzyl-N-methylamino-2'-hydroxybenzoyl) benzoic acid and 11.0 g. (1/20 mole) of 4,7-dichlorothioindoxyl at a temperature of lower than 40° C. and after the addition of 5 g. of phosphoric anhydride, the mixture was reacted for four hours at 95±2° C. The procedure of Example 1 was used and 22.1 g. of a colorless crystal, the lactone of 3-N-benzyl-N-methylamino-6,9-dichloro-11-(ortho-carboxyphenyl) - 11 - hydroxybenzo[4,5]-thiopheno[3,2-b] chromene having a melting point of 224–226° C. were obtained.

Elementary analysis as $C_{30}H_{19}O_3NSCl_2$.—Calculated (percent): C, 68.70; H, 3.65; N, 2.67. Found (percent): C, 68.58; H, 3.53; N, 2.58.

The λ max. of the product in 95% acetic acid solution was at 574 mμ.

Example IV

Preparation of

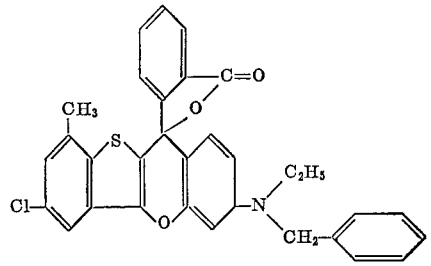

As in Example 1, 18.8 g. (1/20 mole) of 2-(4'-N-benzyl-N-ethylamino-2'-hydroxybenzoyl) benzoic acid and 9.9 g. (1/20 mole) of 5-chloro-7-methylthioindoxyl were condensed to provide 19.3 g. of the colorless crystal of the lactone of 3-N-benzyl-N-ethylamino-7-chloro-9-methyl-11-(ortho-carboxyphenyl) - 11 - hydroxybenzo[4,5]-thiopheno[3,2-b] chromene having a melting point of 203–205° C.

Elementary analysis as $C_{32}H_{24}O_3NSCl$.—Calculated (percent): C, 71.42; H, 4.49; N, 2.60. Found (percent): C, 71.51; H, 4.42; N, 2.56.

The λ max. of the product in 95% acetic acid solution was at 573 mμ.

Example V

Preparation of

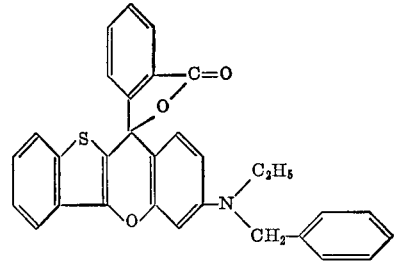

In 40 g. of 80% sulfuric acid were dissolved 18.8 g. (1/20 mole) of 2-(4'-N-benzyl-N-ethylamino-2'-hydroxybenzoyl)-benzoic acid and 7.5 g. (1/20 mole) of thioindoxyl at a temperature of lower than 40° C. and then the system was heated for three hours at 90±2° C. and further for two hours at 98±2° C. Using the procedure of Example 1, 17.5 g. of a colorless crystal, the lactone of 3-N-benzyl-N-ethylamino-11-(ortho - carboxyphenyl)-11-hydroxybenzo[4,5]-thiopheno[3,2-b]-chromene having a melting point of 166–168° C. were obtained.

Elementary analysis as $C_{31}H_{23}O_3NS$.—Calculated (percent): C, 76.07; H, 4.73; N, 2.86. Found (percent): C, 76.14; H, 4.80; N, 2.81.

The λ max. of the product in 95% acetic acid solution was at 572 mμ.

Example VI

Preparation of

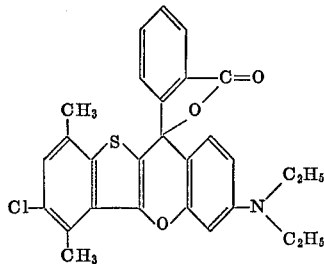

Using the procedure of Example 1, 15.7 g. (1/20 mole) of 2-(4'-N,N-diethylamino-2'-hydroxybenzoyl) benzoic acid and 10.6 g. (1/20 mole) of 5-chloro-4,7-dimethylthioindoxyl were condensed to provide 15 g. of a colorless crystal, the lactone of 3-N,N-diethylamino-6,9-dimethyl-7-chloro-11-(ortho-carboxyphenyl) - 11 - hydroxybenzo [4,5]-thiopheno[3,2] chromene, having a melting point of 241–244° C.

Elementary analysis as $C_{28}H_{24}NSCl$.—Calculated (percent): C, 68.64; H, 4.90; N, 2.86. Found (percent): C, 68.79; H, 4.85; N, 2.81.

The λ max. of the product in 95% acetic acid solution was at 575 mμ.

What is claimed is:

1. A thiophenochromene compound having the formula

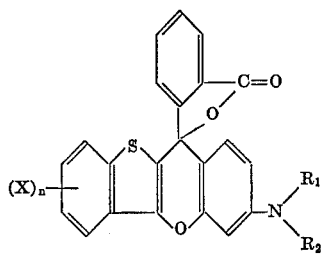

wherein each $R_1$ and $R_2$ is selected from the group consisting of an alkyl group having from 1 to 5 carbon atoms and a benzyl group; wherein X is selected from the group consisting of a hydrogen atom, a halogen atom, an alkoxyl group having from 1 to 5 carbon atoms, a methyl group and a t-butyl group; and wherein n is an integer ranging from 1 to 3, 2. A process for the production of a thiophenochromene compound having the formula

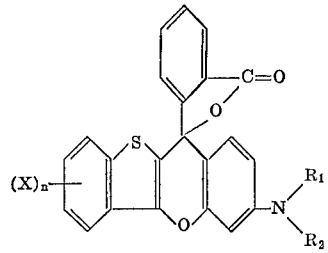

wherein each $R_1$ and $R_2$ is selected from the group consisting of an alkyl group having from 1 to 5 carbon atoms and a benzyl group, wherein X is selected from the group consisting of a hydrogen atom, a halogen atom, an alkoxyl group having from 1 to 5 carbon atoms, a methyl group and a t-butyl group; and wherein n is an integer ranging from 1 to 3 comprising condensing a 2-(4'-N,N-substituted amino-2'-hydroxybenzoyl)benzoic acid having the formula

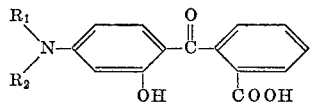

with a thioindoxyl derivative having the formula

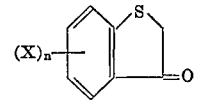

wherein $R_1$, $R_2$, X and n are as defined above, for from 1 to 24 hours at 30 to 100° C. in a condensation reaction medium selected from the group consisting of sulfuric acid having a concentration of higher than 60%, and a mixture of sulfuric acid and phosphoric anhydride, polyphosphoric acid, anhydrous zinc chloride, phosphorus oxychloride or fuming sulfuric acid.

3. The process of claim 2 wherein said 2-(4'-N,N-substituted amino-2'-hydroxybenzoyl)benzoic acid is selected from the group consisting of 2-(4'-N,N-diethylamino-2'-hydroxybenzoyl)benzoic acid and 2-(4'-N-benzyl-N-methylamino-2'-hydroxybenzoyl)benzoic acid.

4. The process of claim 2 wherein said thioindoxyl derivative is selected from the group consisting of 6-ethoxythioindoxyl, 6-chloro-4-methylthioindoxyl, 4,7-dichlorothioindoxyl, 5-chloro-7-methylthioindoxyl, thioindoxyl, and 5-chloro-4,7-dimethylthioindoxyl.

5. The process of claim 2 wherein said condensation reaction medium is sulfuric acid having a concentration higher than 60%.

6. The process of claim 2 wherein said condensation reaction medium is sulfuric acid and a member selected from the group consisting of phosphoric anhydride, polyphosphoric acid, anhydrous zinc chloride, phosphorus oxychloride and fuming sulfuric acid.

References Cited

Desai et al.: C. A., vol. 53: 10200-1 (June 1959).

HENRY R. JILES, Primary Examiner

C. M. SHURKO, Assistant Examiner

U.S. Cl. X.R,
106—22; 117—36.2